UNITED STATES PATENT OFFICE.

ALBRECHT SCHMIDT AND ADOLF STEINDORFF, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

LEUCO-ALKALI PREPARATIONS OF SULFUR DYESTUFFS AND PROCESS OF MAKING SAME.

1,095,237. Specification of Letters Patent. Patented May 5, 1914.

No Drawing. Application filed February 27, 1912. Serial No. 680,335.

*To all whom it may concern:*

Be it known that we, ALBRECHT SCHMIDT, Ph. D., chemist, and ADOLF STEINDORFF, Ph. D., chemist, citizens of the Empire of Germany, residing at Höchst-on-the-Main, Germany, have invented certain new and useful Improvements in Leuco-Alkali Preparations of Sulfur Dyestuffs and Processes of Making Same, of which the following is a specification.

In German Patent No. 200,391 is described a process of manufacturing preparations of sulfur dyes, which consists in mixing the sulfur dyestuffs or their free leuco compounds with carbohydrates or other substances producing a fermentation during which hydrogen is evolved, in presence or absence of alkalis. These preparations are to be used in the fermentation-vat. Now we have found that by proceeding in another way much more valuable and stable products can be obtained, namely products of leuco-alkali salts, by completely reducing the sulfur dyestuffs to the lowest leuco degree with alkaline reducing agents in presence of alkalis, such agents being for instance glucose and alkali—with or without an excess of glucose—or a mixture of glucose and hydrosulfite, and then evaporating the solution to dryness, preferably *in vacuo*, advantageously without isolating the leuco-compound from the solution. There are thus obtained frothy or granulated products in a form which is well adapted for commercial use, very stable, very readily soluble and capable of dyeing even in the so-called "cold lime-fermentation vat" and "cold lime-glucose vat."

According to the new process, the sulfur dyestuffs are advantageously used in the form of pastes free from sulfur and sodium sulfid. Thus the procedure may, for instance, be as follows: The sulfur dyestuff is first boiled or heated with an alkaline solution of glucose and then it is evaporated or boiled down to dryness—preferably in a vacuum—with or without the addition of a further reducing-agent, such as hydrosulfite, glucose etc. By "alkaline reducing agents" are to be understood in the present application, such reducing agents (except the alkali sulfids) as are capable of reducing in presence of an alkali, the most appropriate substances being glucose and its technical equivalents, such for instance, as maltose, levulose, wood-molasses or the like, or mixtures of, for instance, about equal parts of glucose, etc., and wood molasses, said substances to be comprised under the term "glucose-like products."

The above-described process possesses new and surprising features in several respects: For instance the preparations of alkaline leuco salts thus produced are distinguished from the products obtained by a mixture with carbohydrates according to German Patent No. 200,391, in that the former are capable of dyeing good and intense tints even in the cold "glucose-lime vat" and in the cold "lime-fermentation vat" (both these and similar vats being comprised under the term "cold lime-vats"); whereas the other products (obtained by a mixture with carbohydrates) yield in the said vats only very weak tints; indeed they only dye in the cold sodium-glucose-vat, and in this case the tints are much weaker than those obtainable by the present new process. Furthermore, on comparing the vat liquors prepared from the two kinds of products, they are found to be of quite a different appearance, showing, according to the present process, quite a different state of reduction and solubility, etc., both directly on the setting of the vat and when it is further worked. The vats obtained from the preparations of the present application may also be worked simply with a small quantity of glucose or its equivalents and lime, without hydrogen fermentation, or the addition of a substance producing such fermentation, being required. The products obtained according to the present application are also entirely distinguished by their said behavior in the cold glucose-lime- or cold lime-fermentation vat, from the products derived from sulfur dyestuffs treated with glucose as described in German Patent No. 198,691, and which are not obtained by mixing sulfur dyestuffs with carbohydrates (as described in German Patent No. 200,391) but by heating the sulfur dyestuffs with a glucose solution in absence of alkali. According to the present application there are used and evaporated to dryness just those leuco-alkali-salt solutions which are stated in German Patent No. 198,691 to be unsuitable for the purpose in question for several reasons, for instance for the reason that the reduction by means of glucose and alkali-hydrate proceeded too far. Therefore it could not at all be foreseen that, by further evaporation and drying of these alkaline leuco-salt solutions, either with or without an excess of the reducing agent, it was possible by the present process to obtain, without destroying the molecule of the sulfur dyestuff, preparations possessing the very valuable new technical property of dyeing in the lime vat, that is to say of yielding leuco compounds apparently so far reduced that their lime salts are soluble. Furthermore it is a most surprising fact that the dry alkaline leuco-salt preparations thus produced are of excellent stability, not to mention the other technical advantages they possess.

*Examples.*

(1) 100 kg. thiogene black M paste of 20 per cent. strength are heated for some time to boiling with 30 kg. of caustic soda lye of 40° Bé. and 10 kg. of glucose; this mixture is rapidly evaporated to dryness in a vacuum, after adding, if required, 3 kg. of hydrosulfite powder. The resulting porous product, which has a black luster, dissolves in water so as to form a green vat which can immediately be used for black dyeings, after adding, if required some alkali and a small quantity of hydrosulfite-powder, or glucose, or after supplying it with lime or potash, or sodium carbonate and glucose, or any other organic reducing agents. The product thus obtained, which is free or almost free from glucose, is of excellent stability. When using larger quantities of glucose there are also obtained stable products which, during the working of the vat, require no, or only a small, further quantity of glucose.

(2) 400 kg. of thiogene green G. G. conc. powder are heated for a short time with 800 liters of water, 200 kg. of glucose and 600 kg. of caustic soda lye of 40° Bé., and after having added about 50 kg. of hydrosulfite powder the mass is evaporated to dryness in a vacuum. The brownish-black friable product can be immediately used for dyeing green tints.

(3) 100 kg. of thiogene new blue 2RL, in the form of a paste of 20% strength, are heated with 30 kg. of caustic soda lye of 40° Bé., and 10 kg. of glucose and, after having added 3 kg. of hydrosulfite powder, the mass is evaporated. The product which has a dark-brown luster, yields a reddish vat which on addition of some milk of lime turns somewhat yellowish. This vat can be used directly for dyeing. The dyeings obtainable by means of this preparation, for instance the blue tints obtained from thiogene deep blue, are remarkable for their intense red hue. Similar preparations, also readily soluble and dyeing directly even in the lime vat, can be obtained from the other sulfur dyestuffs, for instance from the thiogene yellows, the sulfur yellow G. extra, thiogene brown G R. conc., thiogene cyanin, and their more highly sulfurized derivatives which are more difficultly soluble in sodium sulfid, such as are obtained when using highly sulfurized polysulfids.

(4) 20 kg. of thiogene green G. L. extra conc. powder or any other thiogene-dyestuff, such as thiogene-blue, thiogene-black, thiogene-brown, thiogene-yellow, etc., are heated with about 30 kg. of wood molasses (sulfite-cellulose-pitch) dissolved in 80 liters of water, and with 30 kg. of caustic soda lye of 40° Bé., and, after having added 2 kg. of hydrosulfite powder or glucose or the like, the mass is evaporated to dryness. The dark, frothy product is readily soluble in the lime vat; the vat, which shows a brown color, can be directly used for dyeing.

Having now described our invention, what we claim is:

1. The process of manufacturing new solid and stable leuco-alkali preparations of sulfur-dyestuffs, which consists in evaporating sulfur dyestuffs to dryness with glucosed-like products in presence of alkali.

2. The process of manufacturing new leuco-alkali preparations of sulfur dyestuffs, which consists in evaporating sulfur dyestuffs to dryness with glucose and hydrosulfite in presence of alkali.

3. As new products, solid and stable leuco-alkali preparations of sulfur dyestuffs, being readily soluble in water and diluted alkalis and being distinguished from any other similar preparations by their dyeing from the cold lime-vats nice intense tints.

In testimony whereof, we affix our signatures in presence of two witnesses.

ALBRECHT SCHMIDT.
ADOLF STEINDORFF.

Witnesses:
 JEAN GRUND,
 CARL GRUND.

It is hereby certified that in Letters Patent No. 1,095,237, granted May 5, 1914, upon the application of Albrecht Schmidt and Adolf Steindorff, of Höchst-on-the-Main, Germany, for an improvement in "Leuco-Alkali Preparations of Sulfur Dyestuffs and Processes of Making Same," an error appears in the printed specification requiring correction as follows: Page 1, line 95, for the compound word "glucose-line" read *glucose-lime;* and that the said Letters Patent should be read with this correction therein that the same may conform to the record of the case in the Patent Office.

Signed and sealed this 6th day of July, A. D., 1915.

[SEAL.]

R. F. WHITEHEAD,
*Acting Commissioner of Patents*